United States Patent [19]
Lynch et al.

[11] Patent Number: 5,787,679
[45] Date of Patent: Aug. 4, 1998

[54] ARTICLE DISTRIBUTION

[75] Inventors: David Lynch, Mickleover; David Calladine, Burton-on-Trent, both of United Kingdom

[73] Assignee: Defabs Engineering Systems Limited, United Kingdom

[21] Appl. No.: 869,485

[22] Filed: Jun. 5, 1997

Related U.S. Application Data

[63] Continuation of Ser. No. 667,109, Jun. 20, 1996, abandoned.

[30]    Foreign Application Priority Data

Jun. 24, 1995 [GB] United Kingdom ............. 9512903.7

[51] Int. Cl.$^6$ ........................................ B65B 35/30
[52] U.S. Cl. ................... 53/202; 53/543; 198/367; 198/442
[58] Field of Search ............ 53/202, 543; 198/351, 198/353, 358, 367, 367.1, 367.2, 368, 601, 436, 442, 890, 890.1

[56]    References Cited

U.S. PATENT DOCUMENTS

| | | | |
|---|---|---|---|
| 1,894,547 | 1/1933 | Tucker | 198/442 |
| 2,247,672 | 7/1941 | Thum | 198/442 |
| 2,692,713 | 10/1954 | Silva | 198/442 X |
| 2,847,107 | 8/1958 | Pennington | 198/442 X |
| 3,193,078 | 7/1965 | Amenta et al. | 198/442 X |
| 3,580,640 | 5/1971 | Sture et al. | 198/442 X |
| 3,599,789 | 8/1971 | Kurczak | 198/367 X |
| 3,822,006 | 7/1974 | Shuttleworth | 198/442 X |
| 3,848,746 | 11/1974 | van der Winden | 198/442 |
| 4,003,465 | 1/1977 | Bauer | 198/442 |
| 4,060,165 | 11/1977 | Bauer | 198/442 |
| 4,066,163 | 1/1978 | Rowekamp | 198/442 X |
| 4,147,248 | 4/1979 | Kurczak et al. | 198/442 X |
| 4,166,525 | 9/1979 | Bruno | 198/601 X |
| 4,180,151 | 12/1979 | Goertz | 198/367 |
| 4,616,745 | 10/1986 | Hartness | 198/442 |
| 4,723,649 | 2/1988 | Hartness et al. | 198/442 |
| 4,830,173 | 5/1989 | Hartness et al. | 198/442 |
| 5,174,430 | 12/1992 | Ebira | 198/442 X |
| 5,186,306 | 2/1993 | Sjostrand | 198/442 |
| 5,423,409 | 6/1995 | Wipf | 198/442 X |
| 5,441,142 | 8/1995 | Schneider | 198/442 |

FOREIGN PATENT DOCUMENTS

| | | |
|---|---|---|
| 1 477 647 | 6/1977 | United Kingdom . |
| 2 084 101 A | 4/1982 | United Kingdom . |

*Primary Examiner*—Daniel Moon
*Attorney, Agent, or Firm*—Adams Law Firm, P.A.

[57]    ABSTRACT

Article distribution apparatus comprises means defining a zone through which a plurality of articles can move from a first location to a second location. Distribution means extend between the first and second locations to divide the zone into first and second lanes. The distribution means is movable laterally across the zone to vary the capacity of the first and second lanes of the articles.

8 Claims, 2 Drawing Sheets

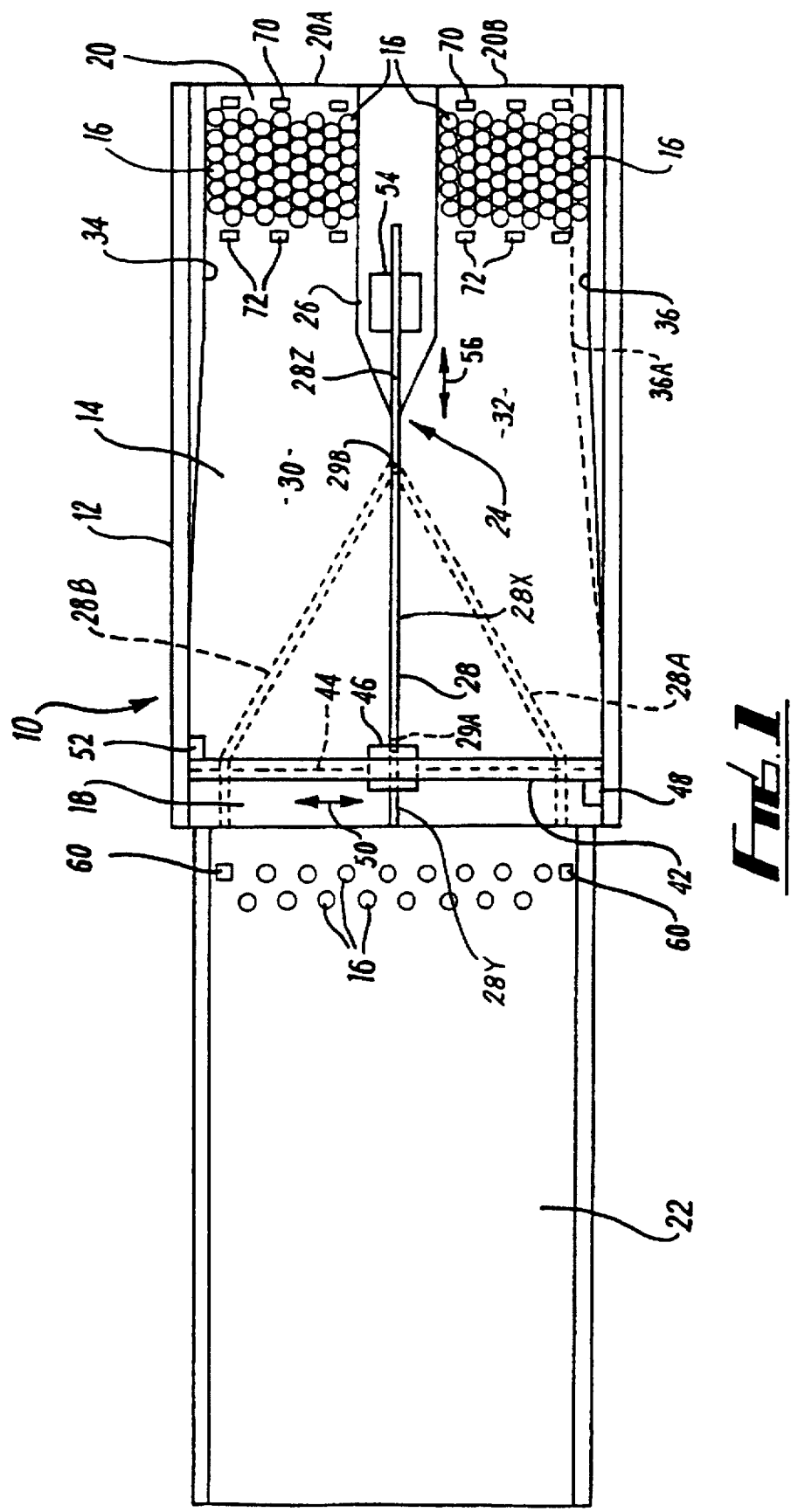

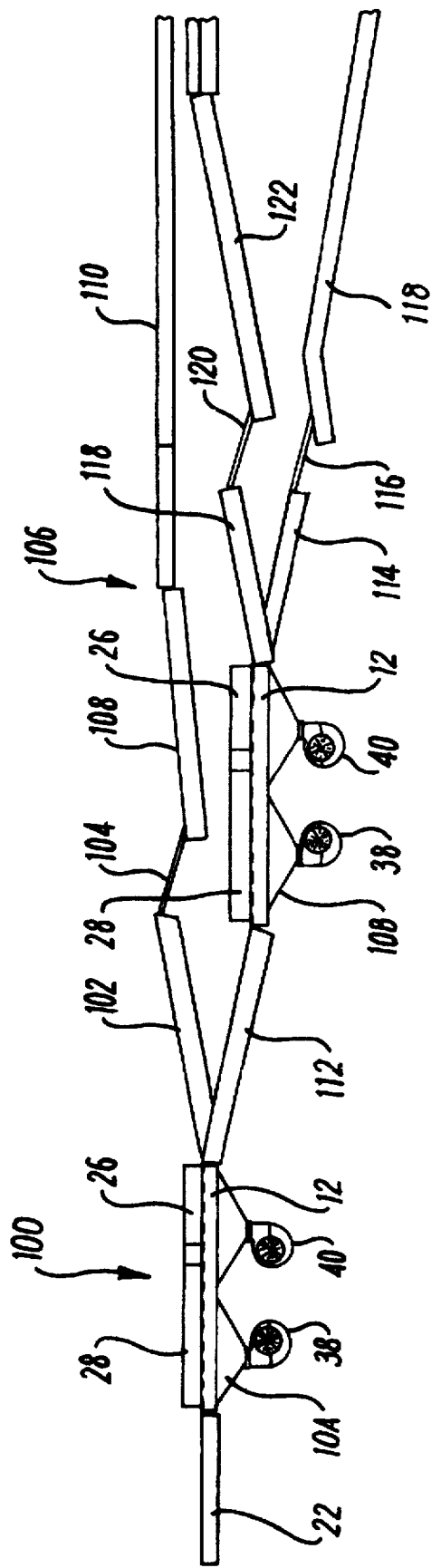

ARTICLE DISTRIBUTION

This application is a 1.62 file-wrapper continuation application of U.S. Ser. No. 08/667,109 filed Jun. 20, 1996 (abandoned).

FIELD OF THE INVENTION

This invention relates to article distribution apparatus.

DESCRIPTION OF THE PRIOR ART

In the food industry, particularly that part of the industry connected with the packaging of biscuits, it is often necessary to employ the use of several wrapping machines for the biscuits being produced. In view of this, accurate distribution of the biscuits to the various wrapping machines is necessary to ensure efficient packaging.

To this end, various methods have been employed. For example, published U.K. Patent Application No. GB-A-2260305 discloses the use of barriers to prevent the biscuits entering particular lanes. Published U.K. Patent Application No. GB-A-2277073 discloses a further method which involves lateral movement of the conveyors transporting the articles.

SUMMARY OF THE INVENTION

According to one aspect of this invention there is provided article distribution apparatus comprising means defining a zone through which a plurality of articles can move from a first location to a second location, distribution means extending between the first and second locations to divide the zone into first and second lanes, the distribution means being movable laterally across said zone to vary the capacity of the first and second lanes for said articles. Thus, of the articles in the zone, the number moving in each lane can be varied by moving the distribution means.

Preferably, the distribution means is movable between first and second positions, whereby when the distribution means is in the first position, the distribution means acts to direct a major proportion of the articles in the zone along the first lane, and when the distribution means is in the second position, the distribution means acts to direct a major proportion of the articles in the zone along the second lane.

In the preferred embodiment, when the distribution means is in the first position, the distribution means acts to direct all the articles in the zone along the first lane, and when the distribution means is in the second position, the distribution means acts to direct all the articles in the zone along the second lane.

The distribution means may be movable to any selected position intermediate said first and second positions.

The distribution means may comprise a movable elongate member and a fixed member. Preferably the movable member is pivotally mounted on the fixed member whereby the movable member is pivotally movable across said zone.

The zone defined by said zone defining means may be a low friction zone. Preferably, the zone defining means comprises an air bed.

At least one of the lanes may be provided with a movable wall member further to vary the capacity of the, or each, lane for said articles.

The movable wall member is preferably movable laterally across its respective lane.

In the preferred embodiment, the fixed member extends from said second location to a central region of said zone, and said elongate member extends from said first location to said central region of said lane for connection to said fixed member. Preferably, the or each movable wall member extends to said second location.

Preferably, the distribution means further includes a bridge member extending from one side of the zone to the other side, and displacement means mounted on the bridge member movable along the bridge member, the displacement means being attached to the movable elongate member to move the elongate member to any selected position between the first and second position.

Preferably, the displacement means comprises a carriage which may be slidably mounted on the bridge member, or may be mounted on the bridge member by a wheel or wheels or another rotary member or other rotary members. The displacement means may further include an elongate belt or chain attached to the carriage and arrange around wheels or sprockets provided substantially at either end of the bridge member. In another embodiment, the carriage may be mounted on the belt or chain. Suitable drive means may be employed to drive the displacement means, for example an electric meter, which may be controlled by a computer.

According to another aspect of this invention there is provided an article transport assembly comprising an article distribution apparatus as described in paragraphs four to fourteen above, feed means to feed a plurality of articles to the article distribution apparatus, a first conveyor to receive articles moving along the first lane and a second conveyor to receive articles moving along the second lane.

In one embodiment, a first wrapping machine is provided to receive articles on the first conveyor. The first conveyor may comprise first and second sections, the second section being downstream of the first section. The second section may be arranged to move articles slower than, faster than, or at the same speed as the first section.

The second conveyor may comprise first and second sections, the second section downstream of the first section wherein the second section is arranged to convey said articles faster than, slower than, or at the same speed as said first section.

The second conveyor may be provided with a further article distribution apparatus as described in paragraphs four to twelve above, and third and fourth conveyors adapted to receive respectively articles from the first and second lanes of said further articles distribution apparatus.

Said further article distribution apparatus may be arranged downstream of said second section of the second conveyor.

The third and fourth conveyors are adapted to feed the articles to third and fourth wrapping machines.

Each of said third and fourth conveyors may comprise first and second sections, each second section being downstream of each respective first section and each second section being adapted to convey said articles faster than, slower than, or at the same speed as said respective first sections.

BRIEF DESCRIPTION OF THE DRAWINGS

An embodiment of the invention will now be described by way of example only with reference to the accompanying drawings in which:

FIG. 1 is a plan view of article distribution apparatus; and

FIG. 2 is a schematic side view of an article transport assembly.

DETAILED DESCRIPTION OF THE INVENTION

Referring to FIG. 1, there is shown article distribution apparatus 10 which comprises an air bed 12 defining a low friction zone 14 through which articles 16 can move from a first location 18 to a second location 20. The first location 18 is defined at an inlet of the zone 14, and the second location 20 is defined at the exit of the zone 14. The second location 20 comprises a first exit 20A and a second exit 20B.

Feed means in the form of a belt conveyor 22 is provided to feed the article 16 to the zone 14 via the first location 18.

Distribution means 24 comprising a fixed member 26, and a movable elongate member 28 is provided on the air bed 12 to divide the zone 14 into a first lane 30 and a second lane 32. The first lane 30 is capable of moving articles 16 to the first exit 20A and the second lane 32 is capable of moving articles 16 to the second exit 20B.

With the movable elongate member 28 is movable between a first position shown by the dotted lines designated 28A, and a second position shown by the dotted lines designated 28B.

In the first position 28A, the movable elongate member acts to direct all the articles 16 entering the zone 14 along the first lane 30 to exit from the zone 14 via first exit 20A.

When the movable elongate member is in the second position 28B, the movable elongate member 28 acts to direct all the articles 16 in the zone 14 along the second lane 32 to exit via the second exit 20B.

In the embodiment shown in FIG. 1, the movable elongate member 28, where shown in solid lines, is arranged centrally of the low friction zone 14, whereby equal numbers of articles 16 are directed along the first and second lanes 30, 32. It will be appreciated that the movable elongate member 28 can be moved to any desired position intermediate the first and second positions 28A, 28B, thereby varying the capacity of each of the lanes 30, 32 for the article 16.

The air bed 12 is provided with movable walls 34, 36 which are movable laterally across the respective lanes 30, 32. The dotted line 36A represents the movable wall 36 having moved to a position inwards of the lane 32. Thus, the movable walls 34, 36 can further vary the capacity of the first and second lanes for the article 16.

Articles suitable for use with the embodiments shown in FIG. 1 are articles which are substantially planar and, preferably, those which are circular in plan. Articles particularly suitable for use with the embodiments shown in FIG. 1 are biscuits.

The movable elongate member 28 is moved laterally across the low friction zone 14 by displacement means which may be in the form of an electro mechanical linear actuator. This apparatus comprise a bridge member in the form of a bar 42 arranged above the low friction zone 14 in the vicinity of the first location 18. The bar 42 houses a toothed belt 44 which is attached via a carriage in the form of a plate 46 to the movable elongate member 28. A motor, which is schematically represented at 48 is connected to the belt 44 to move it in the directions indicated by the double headed arrow 50. An encoder schematically represented at 52 measures the distance moved by the belt and stops the motor when the elongate bar 28 reaches the desired position.

The movable member 28 comprises a central section 28X which is pivotally attached at a pivot point 29A to a first section 28Y. The central section 28X is also pivotally attached at a pivot point 29B to a second section 28Z.

The second section 28Z is slidably arranged in a guide member 54. As the movable member 28 moves back an forth laterally across the low friction zone 14 it will be appreciated that the second section 28Z will need to move backwards and forwards in the direction indicated by the arrow 56 in order to accommodate the lateral movement of the movable member 28. Thus, the second section 28Z is slidably received in the guide member 54.

The feed belt conveyor 22 has the property that it tends to track laterally from side to side, which means that biscuits 16 destined for lanes 30 or 32 may be inadvertently diverted to the wrong lane. In order to take into consideration this lateral tracking, the position of the movable elongate member 28 is continually adjusted. This is effected by the use of a pair of photo electric cells 60 arranged above the belt conveyor 33 in the vicinity of the first location 18. If either photo electric cell detects the presence of a biscuit directly below it, a signal is sent via a computer to the motor 48 and the encoder 52 to adjust the position of the movable member 28.

Referring to FIG. 2, there is shown an assembly 100 which could be used for packing, for example, biscuits into three wrapping machines (not shown). The assembly 100 comprises a feed means in the form of a belt conveyor 22 which is the same as the belt conveyor 22 shown in FIG. 1, and a first article distribution apparatus 10A which comprises all the features of the article distribution apparatus 10 described above and the same features are given the same reference numerals as given in FIG. 1.

As can be seen from FIG. 2, the air bed 12 comprises first and second fans 38, 40 for use in providing the air pressure to lift the articles 16 on the air bed 14. Articles 16 leaving via the exit 20A are fed to a first conveyor 102, thereafter via a channelling board 104, and a further conveyor 106 to a wrapping machine (not shown) which is provided at the far right hand end of the further conveyor 106. The embodiment shown, the conveyor 106 comprises an upstream section 108, and a downstream section 110. In this embodiment, the upstream section 108 travels at a speed slower than the downstream section 110 thereby increasing the separation between the articles 16 on the section 110 for the particular wrapping machine to be used. It will be appreciated that wrapping machines used in connection with this invention are known generally in the art.

Articles 16 exiting distribution apparatus 10A via the exit 20B are fed to a second conveyor 112, which fees the article 216 to a second article distribution apparatus 10B. The article distribution apparatus 10B is, again, the same as the article distribution apparatus 10 described with reference to FIG. 1, and the same features are given the same reference numeral. Article 16 exiting from the zone 14 of the article distribution apparatus 10B via the exit 20A are fed to a third conveyor 114 which feeds the articles 16 to a channelling board 116 and thereafter to a further conveyor 118 to be fed to a second wrapping machine not shown) at the far right hand end of the conveyor 116. Articles exiting from the article distribution apparatus 10B via the exit 20B are fed to a fourth conveyor 118 which, in turn, feeds the article 16 to a channelling board 120 and thereafter to a further conveyor 122 which feeds the article 16 to a third wrapping machine (not shown) arranged at the far right hand end of the conveyor 122. It will be appreciated that the further conveyors 116 and 122 may, in a manner similar to the further conveyor 106, be provided with upstream and downstream sections whereby the upstream section can be arranged to travel slower than, faster than, or at the same speed as, the downstream section.

It will be appreciated that as the movable member 28 moves back and forth across the low friction zone 14, the amount of biscuits 16 moving along the lanes 30, 32 will be increased and or decreased. Where there is an increase in the amount of biscuit 16 moving therealong, it will be necessary for there to be a corresponding increase in the velocity of the conveyors downstream of the air bed 10I or 10B, to ensure that the weight of feed of the biscuits to the appropriate wrapping machines is kept to an appropriate level. Similarly, if the amount of biscuits fed down either of the lanes is decreased, it will be necessary for there to be a corresponding decrease in the relevant conveyors downstream of the air bed 10 or 10B.

The increase or decrease in the speed of the conveyors to correspond with the increase or decrease in the amount of the biscuits 16 is effected by the use of photo electric cells 70, 72 arranged over the biscuits in the area of the zone immediately upstream of the exits 20A, 20B. If all three of the photo electric cells detect the absence of biscuits 16 directly beneath them, a signal sent via a computer (not shown) will slow down the relevant conveyors downstream. If the photo electric cells 72 detect the presence of biscuits 16, a signal will be sent to the relevant conveyors downstream to speed up.

Various modifications can be made to the invention without departing from the scope thereof, for example any suitable number of article distribution apparatus 10 could be provided in the article transport apparatus 100, depending upon the number of wrapping machines to be used. Also, the movable walls 34, 36 can be arranged to move any desired distance laterally across the first and second lanes 30, 32.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An article distribution apparatus for controlling the delivery of articles to a selected one of a plurality of wrapping stations, said apparatus comprising:
   (a) a low friction zone adapted to carry the articles from an upstream location to a downstream location;
   (b) a centrally-disposed distribution arm pivotably mounted between the upstream and downstream locations and dividing the zone into first and second lanes, the distribution arm being movable laterally across the zone to vary the number of articles entering the first and second lanes; and
   (c) first and second conveyors extending respectively from the first and second lanes at the downstream location of the low friction zone, each conveyor being movable independent of the other at a desired selectively variable speed to convey articles in controlled succession to one of the plurality of wrapping stations, whereby the distribution arm and the first and second conveyors cooperate to maintain an efficient flow of articles to each of the plurality of wrapping stations.

2. An apparatus according to claim 1, wherein the distribution arm is movable between a first position adjacent to one side of the zone and a second position adjacent to an opposite side of the zone, such that:
   i. when the distribution arm is in the first position, all of the articles in the zone are directed into the first lane; and
   ii. when the distribution arm is in the second position, all of the articles in the zone are directed into the second lane.

3. An apparatus according to claim 1, wherein the distribution arm is movable in a first direction extending from a center of the zone towards one side of the zone, and in a second direction extending from the center of the zone towards an opposite side of the zone, such that:
   i. when the distribution arm is moved in the first direction, a majority of the articles in the zone are directed into the first lane; and
   ii. when the distribution arm is moved in the second direction, a majority of the articles in the zone are directed into the second lane.

4. An apparatus according to claim 1, wherein at least one of the lanes includes a movable side wall member to further vary the capacity of the, or each, lane for said articles, the movable wall member being movable laterally across its respective lane.

5. An apparatus according to claim 1, wherein the distribution arm comprises a movable elongate member and a fixed member, the movable member being pivotally mounted adjacent to the fixed member for pivotable movement across said zone.

6. An apparatus according to claim 5, wherein the fixed member of the distribution arm extends from the second location to a central region of said zone, and wherein said movable elongate member extends from the central region to said first location.

7. An apparatus according to claim 6, and including a bridge member extending laterally from one side of the zone to the other, and further including displacement means mounted on the bridge member and movable along the bridge member, the displacement means being attached to the movable elongate member to move the elongate member laterally to any selected position between opposite sides of the zone.

8. An article distribution apparatus for controlling the delivery of articles to a selected one of a plurality of wrapping stations, said apparatus comprising:
   (a) a low friction zone adapted to carry the articles from an upstream location to a downstream location;
   (b) a centrally-disposed distribution arm pivotably mounted between the upstream and downstream locations and dividing the zone into first and second lanes, the distribution arm being movable laterally across the zone to vary the number of articles entering the first and second lanes; and
   (c) first and second conveyors extending respectively from the first and second lanes at the downstream location of the low friction zone, each conveyor having separately controllable upstream and downstream sections movable independent of each other at desired selectively variable speeds to convey articles in controlled succession to one of the plurality of wrapping stations, whereby the distribution arm and the first and second conveyors cooperate to maintain an efficient flow of articles to each of the plurality of wrapping stations.

* * * * *